United States Patent [19]
Dewberry et al.

[11] 4,154,981
[45] May 15, 1979

[54] TELEPHONE SYSTEM FOR DIVER COMMUNICATION

[75] Inventors: Larry F. Dewberry; Eric J. Tuovila; Christian P. F. Werle, all of Panama City, Fla.

[73] Assignee: The United States of America as represented by the Secretary of the Navy, Washington, D.C.

[21] Appl. No.: 861,236

[22] Filed: Dec. 16, 1977

[51] Int. Cl.² ............................................. H04M 9/00
[52] U.S. Cl. ................................... 179/1 P; 340/5 T; 179/1 UW; 179/1 VC
[58] Field of Search ................ 179/1 P, 1 UW, 1 CN, 179/1 SH, 1.VC; 340/5 T

[56] References Cited
U.S. PATENT DOCUMENTS

| | | | |
|---|---|---|---|
| 3,863,027 | 1/1975 | Acks | 179/1 UW |
| 3,947,636 | 3/1976 | Edgar | 179/1 P |
| 4,044,205 | 8/1977 | Mullarkey | 179/1 P |

Primary Examiner—Kathleen H. Claffy
Assistant Examiner—E. S. Kemeny
Attorney, Agent, or Firm—Richard S. Sciascia; Harvey A. David

[57] ABSTRACT

A telephone system for use by divers employing demand breathing apparatus. Sounds picked up by each diver's microphone are processed by selective filtering, amplification, rectification and comparison to a reference voltage level to provide logic signals representative of presence or absence of inhalation noise that could mask voice transmissions of other divers or of a tender. The microphone output to listening stations is switched through an attenuation path by the logic signal representing inhalation noise and through a by-pass or full strength path by the other logic signal.

10 Claims, 2 Drawing Figures

TELEPHONE SYSTEM FOR DIVER COMMUNICATION

BACKGROUND OF THE INVENTION

This invention relates to telephonic communications with divers, and more particularly to improvements in systems for conversing with divers, notably those using diving rigs having a demand type of breathing gas supply.

Telephonic communication with divers has generally been marginal, at best, due to a number of factors including, as one of the most troublesome, the high level to noise produced in the diver's helmet or mask by incoming air or breathing gas. This is especially the case in demand breathing systems wherein a valve is actuated in response to incipient inhalation efforts to admit a burst of pressurized breathing gas into the helmet or mask, and to terminate the inflow of gas when inhalation ceases and exhalation is to begin. Because the demand valve operates intermittently, the breathing gas must be supplied at a greater flow rate than in continuous flow systems, a hissing noise is made that is of a high level during inhalation and that is absent during exhalation, or while the diver is speaking.

When more than one demand breathing diver is being monitored, or when two or more such divers are capable of communicating with one another and with monitoring tenders, the transmitted pulses of air flow noise during their respective inhalations interfere greatly with the intelligibility of their transmitted speech. At times the breathing of several divers will produce a substantially continuous high noise level at the receiving stations, and communications between divers and tending personnel are severly hampered.

Although the intermittent high noise level of demand air flow, generally referred to as inhalation noise, is deleterious to voice communication, it provides useful information to the diver tenders who monitor those sounds for clues as to the diver's condition. Accordingly, it is not desirable to eliminate the breathing or inhalation noises completely as by using a voice controlled microphone system that transmits only in response to predetermined human voice factors. Rather, both the voice communication and the breathing noise must be considered as useful communication data, and the problem is to monitor several divers without having the inhalation noises interfere with the voice transmission.

Various arrangements of automatic gain contrl amplification, selective frequency filtering, and thresholding techniques have been unsuccessfully tried in efforts to overcome this problem in diving telephony in the way background noise problems have been more less successfully treated in other situations. The primary reason for such lack of success is that the noise source in the diving system is located in a very confined area, such as the popular oronasal face mask known as a "Bankmask," wherein the microphone is substantially the same distance from the noise source as it is from the diver's mouth. This is in distinction with other noisy environments, such as factories or aircraft cabins, wherein the noise sources are at a distance from the microphone that is many times the distance between the speaker and the microphone. That distance disparity assures differences in sound energy levels that permit ready discrimination against distant background noise by the aforementioned prior art techniques, but do not discriminate effectively against inhalation noise generated in close proximity to the microphone of a diving rig.

SUMMARY OF THE INVENTION

With the foregoing in mind, the present invention aims, as its principal object, to provide an improved diver communication system that overcomes or avoids many of the problems and disadvantages of the prior art.

Another important object of the invention is the provision of a communication system that is particularly well adapted to permit intelligible voice communication with one or more divers using demand breathing apparatus.

Yet another object is the provision of a diver communication system or telephone that permits monitoring of the breathing noise of one or more divers as well as providing for voice conversation therewith.

Still another object is the provision of a divers telephone for use in conjunction with demand breathing diving equipment, wherein the breathing noise of each diver is attenuated so as not to interfere with voice transmissions of another diver or of the tending personnel.

A further object is to provide a novel breathing noise reduction circuit for a diver telephone system of the foregoing character, which circuit is simple, reliable, and does not require either complex voice signal recognition means or automatic gain control means.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
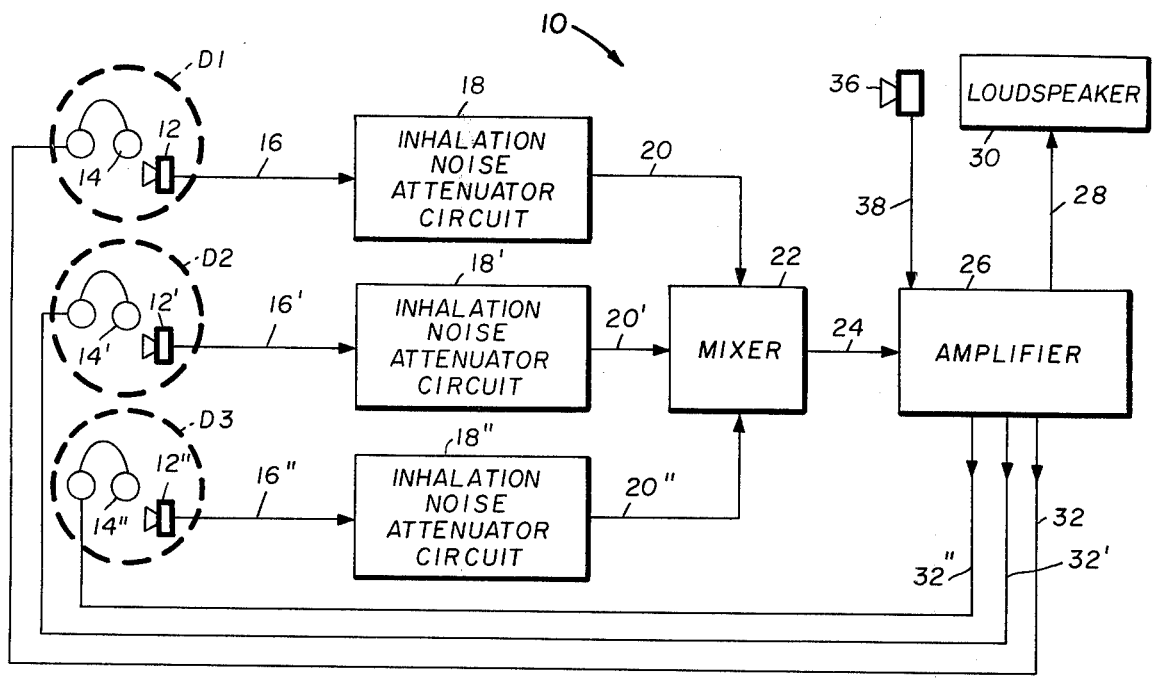
FIG. 1 is a block diagram of a diver communication system embodying the invention.

Referring to FIG. 1 a diver communication system embodying the invention is indicated generally at 10 and, although the invention can be used in systems for communication with a single diver, the invention will be described with reference to a system of the type wherein a plurality of divers can talk with one another as well as with topside personnel or tenders. In this example the system 10 serves three divers D1, D2, and D3, whose demand breathing system helmets or masks are equipped with microphones 12, 12' and 12", and with earphones or headsets 14, 14' and 14", respectively.

Figure 2:
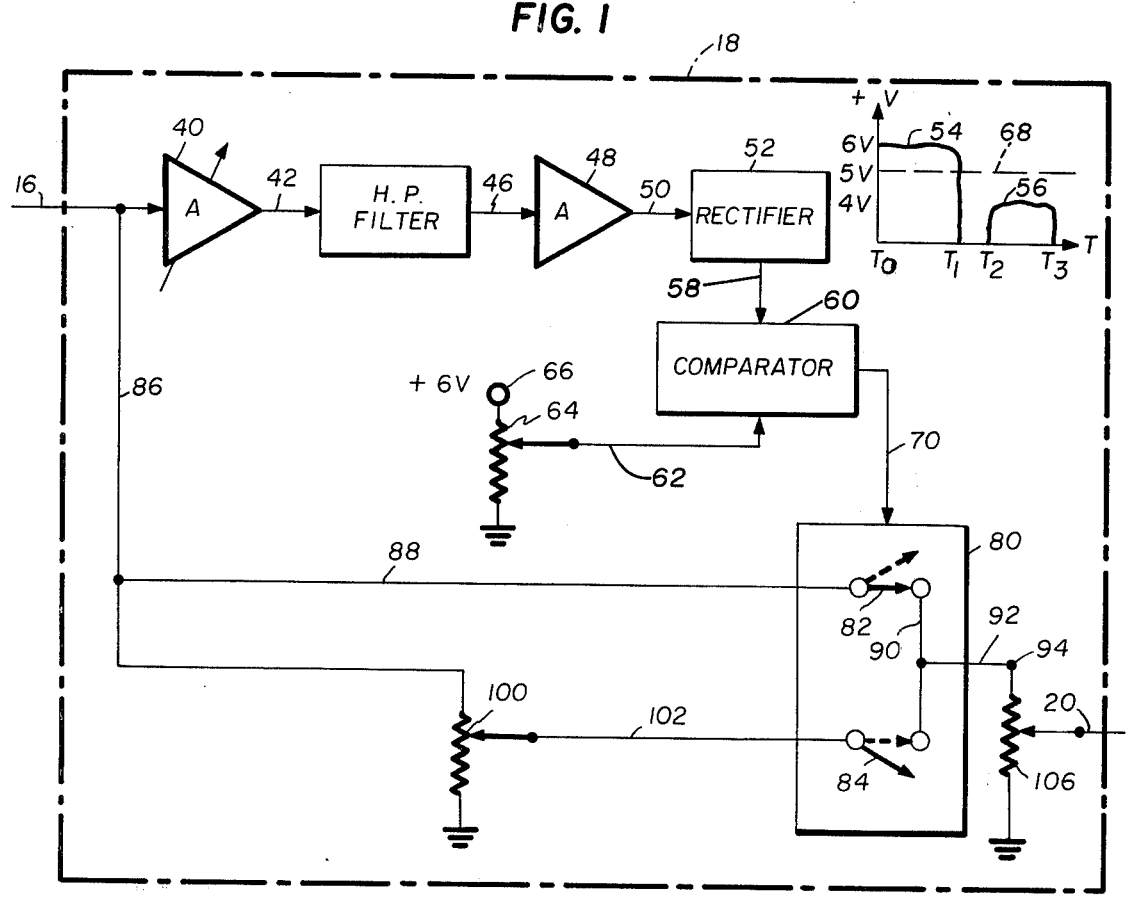
FIG. 2 is a diagrammatic illustration, in block form, of a noise reduction circuit forming part of the system of FIG. 1.

The output of the microphone 12 is connected, as shown by flow line 16 to the input of an inhalation noise attenuation circuit 18. Circuit 18, later described in detail with reference to FIG. 2, is response to a predetermined level of inhalation noise to attenuate the microphone output signal, and to a lack of such inhalation noise to pass the mircophone output signal unattenuated. The output of the inhalation noise attenuation circuit 18 is applied, as shown by line 20, as one input to an audio signal mixer 22.

Similarly, microphones 12' and 12" are connected through lines 16' and 16", inhalation noise attenuation circuits 18' and 18", and lines 20' and 20" to provide additional inputs to the mixer 22.

The mixer 22 has its output connected via line 24 to an audio power amplifier 26, an output of which is fed as shown by line 28 to drive a suitable loudspeaker 30 through which the diver tenders can listen to the speech, and to a desired degree to the breathing noises, of the three divers. The amplifier 26 also provides output via lines 32, 32', and 32" to the diver's headsets 14, 14' and 14" whereby each diver can hear the other divers. A tender's microphone 36 provides an input via line 38 to the amplifier 26, by which topside personnel can talk to the divers.

Referring now to FIG. 2, the inhalation noise attenuator circuit 18 comprises, as the first element in a control signal processing path, an adjustable gain audio amplifier 40 connected to receive the output of microphone 12 as its input. The purpose of the amplifier 40, which is of conventional construction, is simply for use in matching the microphone to the remainder of the circuit 18, and is not intended as a volume control. Thus, once set for use with a given microphone or type of microphone, the amplifier 40 need not be readjusted.

The output of amplifier 40 is applied, a shown by line 42, to a high pass filter 44. The filter 44, which is conveniently of the type using an RC network in association with an operational amplifier, is selected to favor the passage of those frequencies in excess of 10,000 Hz. It has been determined that the hissing noise of the breathing gas when the demand valve is open is made up mainly of frequencies above 10,000 Hz, while the vocalization frequencies of speech to be transmitted in the system 10 are mainly below 10,000 Hz. Thus, breathing noise signals, when they occur, are passed readily by filter 44 with little attenuation, whereas voice signals, when they occur, are passed with considerable attenuation, thereby providing a separation of amplitude between breathing noise signals and voice signals at the output 46 of the filter. This output is applied as the input to an amplifier 48, the gain of which further separates the voice signal level from the inhalation noise signal level.

The output of amplifier 48 is applied via line 50 to a rectifier 52, so as to provide d.c. analog voltage signals 54 and 56, corresponding to periods of inhalation noise and voice, respectively, as the rectifier output 58. Accordingly, during the period ($T_0$-$T_1$), a voltage of about +6 volts is present on line 58, whereas during period ($T_1$-$T_2$) a zero voltage condition obtains, and during period ($T_2$-$T_3$), corresponding to a voice transmission, a voltage of +4 volts exists.

The output 58 of the rectifier is applied as one input to a voltage comparator 60. The other input 62 to the comparator 60 is derived from a variable reference voltage source in the form of a potentiometer 64 connected between a positive voltage supply 66 that is at least a great as the voltage signal 54 representative of inhalation noise. The wiper of the potentiometer 64 is positioned to select a voltage reference level that lies between the noise and voice signals 54 and 56, that reference level being indicated at 68 as say 5 volts.

The comparator 60 compares the voltage level of the input, line 58, from the rectifier 52 to the reference input, line 62. Whenever the rectifier input is greater than the reference level 68, the comparator produces a first output condition, say a positive voltage on line 70, and whenever the rectifier input falls below the reference level 68, the comparator produces a second output condition, say a negative voltage on line 70. These output conditions are applied to control actuation of a switching device 80 to effect either attenuation of the inhalation noise signals or full strength transmission of voice signals in a manner about to be made apparent.

Th switching device 80 conveniently comprises a conventional solid state relay responsive to changes in voltage input for rendering switch paths, represented as switches 82 and 84, either conductive or non-conductive. In the present example, switch 82 is closed and switch 84 is open whenever the rectifier output is below the reference level, that is, whenever the second output condition exists at line 70. Alternatively, switch 82 is opened and switch 84 is closed whenever the rectifier output rises above the reference level and the first output condition exists on line 70.

When switch 82 is closed, a full strength transmission path can be traced from the microphone signal input, line 16, through conductors 86, 88, switch 82, and conductors 90, 92 to point 94. When switch 84 is closed, an attenuated signal path can be traced from line 16 through conductor 86, an attenuation selecting potentiometer 100, a conductor 102, switch 84, and conductors 90, 92 to point 94.

A potentiometer 106 is conveniently included between point 94 and the output line 20 of the circuit 18. This potentiometer is useful in balancing the output of the circuit 18 inhalation noise attenuation circuits 18' and 18". It will be understood that the constructions of the latter two circuits are identical to that of circuit 18 and need not be further described.

MODE OF OPERAION

In initially setting up the system 10, the microphone input amplifiers, or preamplifiers 40 corresponding to the microphones 12, 12' and 12" are adjusted as necessary to provide suitable inputs to the respective high pass filters 44. Thereafter, no adjustment of the amplifiers 40 need be made unless a substantially different microphone is substituted in the system. Similarly, the potentiometers 106, once set to balance the output levels of the three diver channels, will not normally require any further adjustment.

When the divers are dressed and otherwise ready, the potentiometer 64 of each circuit 18, 18', 18" will be adjusted to provide a reference level 68 that is between the voltage levels of the inhalation noise signal 54 and the voice signal 56. With the potentiometer 64 so adjusted, when the diver is breathing in, the inhalation noise will produce a signal 54 that will cause the switch 84 of switch device 80 to be conductive, and switch 82 to be non-conductive, whereby the microphone signal on line 16 will be attenuated by potentiometer 100 in the attenuation path. The attenuation imposed may be selected by adjustment of potentiometer 100 so that the inhalation noise is either completely inaudible at the loud speaker 30 and in the earphones of the other divers, or is sufficiently audible to provide a check on the diver's breathing but not loud enough to interfere with intelligibility of voice transmissions of other divers or of the tenders.

When the diver ceases an inhalation, the voltage of signal 54 falls below the reference level 68 and the switch device 80 is actuated to render switch 84 non-conductive and switch 82 conductive. This makes the full strength path effective to connect the microphone input on line 16 directly to point 94 and, except for some possible small balancing attenuation in potentiometer 106, directly to output line 20. In this condition, voice transmissions by the diver are passed with substantially full strength to the mixer 22 and amplifier 26 for driving the speaker 30 and earphones 14, 14', and 14".

From the foregoing, it will be appreciated that the breathing noise of each diver serves to control its own attenuation circuit, and that no reliance is placed on the voice transmissions to initiate or control the attenuation circuit actuation. Inasmuch as a given diver will never be trying to speak while he is breathing in, the system 10 provides a remarkably simple, reliable, yet effective apparatus for avoiding the interference with communication that would be caused by transmission of inhalation noises characteristic of demand breathing diving equipment.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A diver telephone system for communication by a plurality of divers each using a demand breathing apparatus characterized by a predetermined noise condition that occurs only during the using diver's inhalations and includes frequencies in a predetermined range different from that of the diver's speech, said system comprising:
   a plurality of diver microphones each associated with the demand breathing apparatus of a corresponding one of said divers and responsive both to said noise condition thereof and to the speech of that one diver to provide an output representative thereof;
   at least one listening station comprising means for reproducing speech of each of said divers; and
   a plurality of inhalation noise attenuation circuit means, each responsive to the output of a corresponding one of said diver microphones so as to attenuate the entire output of said corresponding one of sid microphones whenever that microphone is subject to said predetermined noise condition of the associated demand breathing apparatus and to pass to said listening station at substantially full strength the output of that microphone only when said predetermined noise condition of the associated breathing apparatus is absent;
   whereby speech outputs from any one of said diver microphones is passed by the respective noise attenuation circuit for reproduction by said listening station substantially free of interference from said noise conditions of any others of said demand breathing apparatus.

2. A diver telephone system as defined in claim 1 and wherein each of said plurality of noise attenuation circuit means comprises:
   a signal processing path including means for generating first and second logic signals representative of presence and absence, respectively, of said predetermined noise condition;
   a mircophone output attenuation path;
   a microphone output full strength path; and
   switching means, responsive to said logic signals, for connecting said microphone alternatively to said attenuation path and said full strength path.

3. A diver telephone system as defined in claim 2, and wherein said signal processing path comprises:
   filter means for favoring passing of higher frequencies characteristic of said noise and for attenuating lower frequencies characteristic of voice transmissions;
   voltage amplifier means, responsive to the output of said filter means, for increasing the differential in signal amplitudes between said higher and lower frequencies;
   rectifier means, responsive to the output of said voltage amplifier means, for providing a direct current signal having voltages representative of said amplitudes;
   a source of a reference voltage;
   comparator means, responsive to said direct current signals, for providing said first logic signal whenever said direct current signal voltage is greater than said reference voltage and said second logic signal whenever said direct current signal is less than said reference voltage.

4. A diver telephone system as defined in claim 3, and wherein said source of a reference voltage is adjustable to selectively vary said reference voltage.

5. A diver telephone system as defined in claim 4, and wherein said attenuator path comprises potentiometer means for selectively varying said attenuating of said one microphone output to said listening station.

6. A diver telephone system as defined in claim 5, and wherein:
   said signal processing path further comprises adjustable gain preamplifier means between said microphone and said filter means, for matching said microphone to said signal processing path.

7. A diver telephone system as defined in claim 6 and further comprising:
   mixer means, responsive to the outputs of each of said attenuation circuit means, for providing a combined transmission signal to said listening station.

8. A diver telephone system as defined in claim 7, and wherein:
   said listening station comprises a loud speaker and amplifier means, responsive to said combined transmission signal, for driving said loud speaker.

9. A diver telephone system as defined in claim 8 and further comprising:
   a tender microphone having its output connected as an input to said power amplifier means; and
   a plurality of diver earphones, each corresponding to a corresponding one of said diver microphones and demand breathing apparatus, said earphones being connected to receive transmission outputs from said power amplifier means, whereby said divers can talk to and hear each other and can talk to and hear a tender.

10. A diver telephone as defined in claim 9, and wherein:
    said attenuator circuit means each further comprises a variable attenuator between said switching means and said mixer means, whereby the outputs of said plurality of attenuator circuit means can be balanced.

* * * * *